June 15, 1965 M. A. MANDELKO 3,188,923
PNEUMATIC CYLINDER STRUCTURE
Filed Feb. 26, 1962
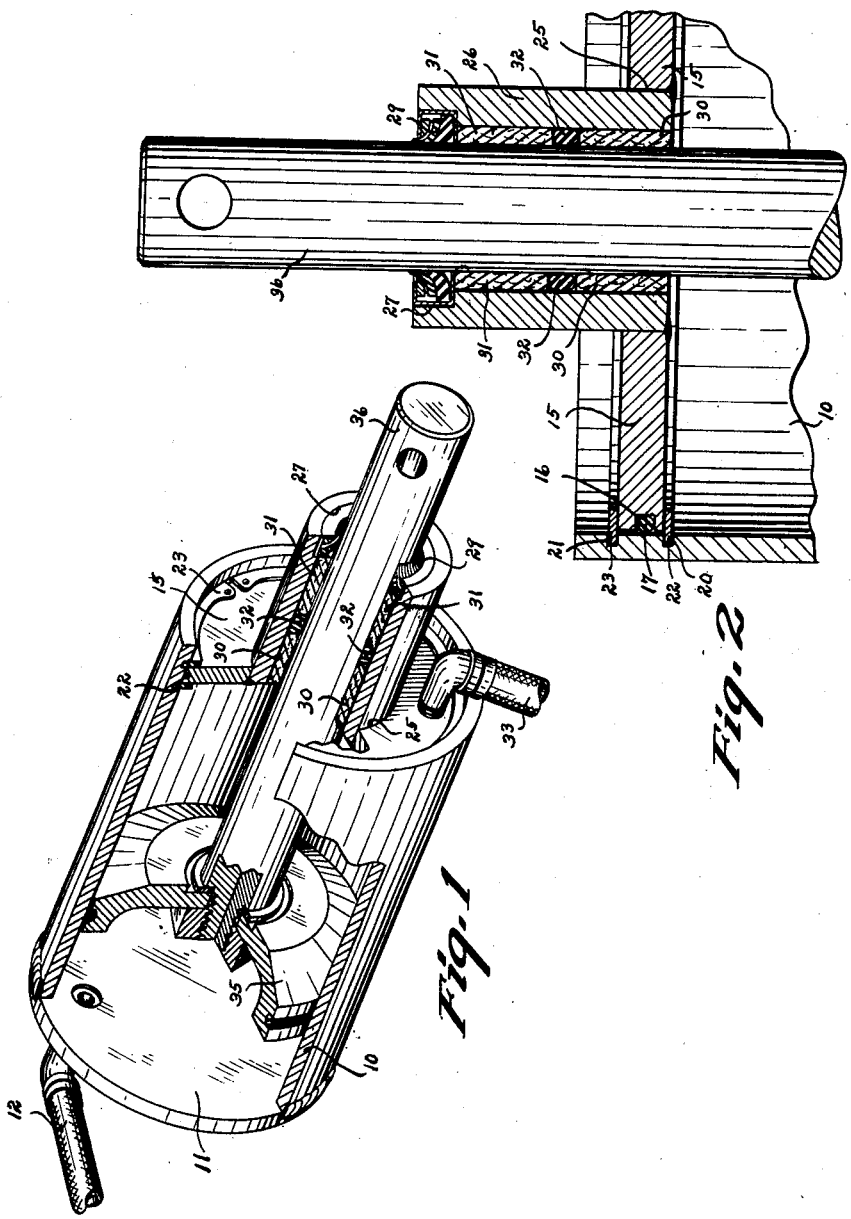
INVENTOR
MELVIN A. MANDELKO
BY Talbert Dick & Barley
ATTORNEYS
WITNESS
NORMAN G. TRAVISS 3,188,923
PNEUMATIC CYLINDER STRUCTURE
Melvin A. Mandelko, 1231 6th Ave. S.,
Fort Dodge, Iowa
Filed Feb. 26, 1962, Ser. No. 175,427
1 Claim. (Cl. 92—155)

This invention relates to power cylinders and more particularly to air actuated power means having a cylinder structure and reciprocating piston therein.

Pneumatic and hydraulic power cylinders are old in the art. In general they consist of an enclosed cylindrical housing having a piston slidably mounted therein and with a shaft secured to the piston and slidably extending through one end of the cylindrical housing. Air or like under pressure is introduced into one end of the housing to drive the piston in one direction, and introduced in the other end to drive the piston in the other direction. Such power cylinders, however, have several objections. Perhaps the most serious problem is the high cost of manufacture. Also there is the problem of properly sealing the cylinder end through which the piston shaft extends. Furthermore, there is a greasing problem of the bearing at the end of the cylinder and through which the piston shaft reciprocates.

Therefore one of the principal objects of my invention is to simplify the manufacture of power cylinders.

A further object of this invention is to provide a power cylinder that loses only a minimum amount of pressure at the point where its piston shaft reciprocates through the cylinder end area.

A still further object of this invention is to provide a power cylinder that is self-lubricating.

Still further objects of my invention are to provide a power cylinder that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my power cylinder with sections cut away to more fully illustrate its construction; and FIG. 2 is an enlarged longitudinal sectional view of the bearing end portion of the power cylinder.

As herebefore indicated, one of the chief phases of this invention is the manufacture of the item. I first take a length of tube 10. Welded, brazed or otherwise secured onto the rear end of the tube 10 is a disc plate 11. This plate seals the rear end of the tube except for the conduit 12 that communicates through the plate to the inside rear of the tube 10, as shown in FIG. 1. The numeral 15 designates the front detachable disc plate and which has an outside diameter substantially that of the inside diameter of the tube 10. This plate 15 has a peripheral groove 16. The numeral 17 designates an O-ring in the groove 16. In the inside forward wall of the tube 10 are two spaced apart continuous grooves 20 and 21, respectively. In these two grooves are two detachable keeper flange rings 22 and 23, respectively. Through the center of the plate 15 I form a hole 25. Welded, brazed or otherwise secured in the hole 25 is a pipe length 26. This pipe length extends longitudinally of the tube cylinder 10. In the forward end of the pipe 26 is a recess 27 holding a ring wiper 29. There are two bearing sleeves 30 and 31 pressed into the pipe 26, with an O-ring 32 between them as shown in FIG. 2. These two bearing sleeves 30 and 31 are most important inasmuch as they must provide lubrication and tightly successfully embrace and support the piston shaft of the unit. Therefore these two sleeves are of bronze and are impregnated with a suitable lubricant. Some bronze bearing means are impregnated with a grease, but I recommend that the bearing sleeves 30 and 31 be of a graphite impregnated bronze. The numeral 33 designates a conduit extending through the end plate 15 for communication with the inside forward end of the tube cylinder 10. The numeral 35 designates a piston having the power shaft 36 adapted to slidably extend through the bearing sleeves 30 and 31, and the O-ring 32.

To assemble my unit, the piston 35 is placed inside the cylinder, with its shaft extending through the open end of the cylinder. Next, the back ring keeper 22 is placed in the back groove 20. Next, the sleeves 30 and 31 and O-ring 32 are threaded onto the piston shaft 36 and the plate 15 is slid into the forward end of the cylinder until it engages the keeper ring 22. Next, the keeper ring 23 is placed in the groove 21. My unit is now assembled and ready for use. If flowable matter under pressure is forced through the conduit 12, the piston will be moved forwardly and if flowable matter under pressure is forced through the conduit 33, the piston will be moved rearwardly.

From the foregoing it will be seen that I have provided a highly desirable power cylinder structure and one that can be manufactured at a relatively low cost. Also, my power cylinder is of long life, and can be assembled or disassembled easily and quickly.

Some changes may be made in the construction and arrangement of my pneumatic cylinder structure without departing from the real spirit and purpose of my invention, and it is my intention to cover by my claims, any modified forms of structure or use of mechanical equivalents which may be reasonably included within their scope.

I claim:
In a power cylinder, comprising, in combination,
 (a) a cylindrical tubular housing closed at its rear end,
 (b) an end member closing the forward end of said cylindrical tubular housing and having a centrally located hole,
 (c) a hollow cylindrical bearing extending outwardly from said end member and having one of its ends secured into the hole of said end member,
 (d) a ring-type sealing means in said bearing,
 (e) at least one bearing sleeve in said bearing and having one of its ends adjacent said ring-type sealing means,
 (f) a piston slidably mounted in said cylindrical tubular housing,
 (g) a piston shaft secured to said piston and slidably extending through said ring-type sealing means and said sleeve,
 (h) a conduit communicating with the inside rear of said housing, and
 (i) a conduit communicating with the inside front of said housing.

(References on following page)

References Cited by the Examiner

UNITED STATES PATENTS

| | | |
|---|---|---|
| 2,132,867 | 10/38 | Davis. |
| 2,209,032 | 7/40 | Mott _____ 309—2 |
| 2,819,934 | 1/58 | Luterick _____ 309—2 |
| 2,886,005 | 5/59 | Bryan. |
| 2,934,040 | 4/60 | Blatt et al. |
| 2,982,590 | 5/61 | Gunning _____ 309—4 |
| 3,003,469 | 10/61 | Kelsey. |
| 3,010,433 | 11/61 | Codling. |

FRED E. ENGELTHALER, *Primary Examiner.*

KARL J. ALBRECHT, SAMUEL LEVINE, *Examiners.*